US006736460B2

United States Patent
Becker et al.

(10) Patent No.: US 6,736,460 B2
(45) Date of Patent: May 18, 2004

(54) JOINT FITTING FOR A VEHICLE SEAT WITH A FORWARD TILTABLE SEAT BACK

(76) Inventors: Burkhard Becker, Obenkatternberg 25, 42657 Solingen (DE); Robert Houston, Landrat-Trimborn-Strasse 79, 42799 Leichlingen (DE); Markus Gumbrich, Fürkerstrasse 31, 42697 Solingen (DE)

( * ) Notice: Subject to any disclaimer, the term of this patent is extended or adjusted under 35 U.S.C. 154(b) by 0 days.

(21) Appl. No.: 10/222,526

(22) Filed: Aug. 16, 2002

(65) Prior Publication Data

US 2003/0052523 A1 Mar. 20, 2003

(30) Foreign Application Priority Data

Sep. 19, 2001 (DE) .......................................... 101 46 300

(51) Int. Cl.[7] .................................................. B60N 2/20
(52) U.S. Cl. .................................................. 297/378.12
(58) Field of Search ........................ 297/378.12, 378.1, 297/378.13, 376, 354.1

(56) References Cited

U.S. PATENT DOCUMENTS

| 4,269,446 | A | | 5/1981 | Gersmann et al. | |
|---|---|---|---|---|---|
| 4,869,541 | A | * | 9/1989 | Wainwright | 297/378.1 X |
| 5,466,048 | A | * | 11/1995 | Fowler et al. | 297/378.12 |
| 5,547,254 | A | * | 8/1996 | Hoshihara | 297/378.12 X |
| 5,577,805 | A | * | 11/1996 | Glinter et al. | 297/378.12 |
| 5,664,838 | A | * | 9/1997 | Baloche | 297/378.12 |
| 5,810,444 | A | * | 9/1998 | Refior et al. | 297/378.12 |
| 5,927,809 | A | * | 7/1999 | Tame | 297/378.12 X |
| 5,951,108 | A | * | 9/1999 | Bauer et al. | 297/378.12 |
| 6,030,042 | A | | 2/2000 | Bauer et al. | |
| 6,332,647 | B1 | * | 12/2001 | Yoshida et al. | 297/378.12 X |
| 6,332,650 | B1 | * | 12/2001 | Krist et al. | 297/378.12 |
| 6,336,679 | B1 | * | 1/2002 | Smuk | 297/378.12 |
| 6,352,310 | B1 | * | 3/2002 | Schmidt et al. | 297/378.12 |
| 6,464,299 | B1 | * | 10/2002 | Castagna | 297/378.12 |
| 6,619,744 | B2 | * | 9/2003 | Reubeuze | 297/378.12 |
| 2002/0125757 | A1 | * | 9/2002 | LeTournoux | 297/378.12 |
| 2003/0080601 | A1 | * | 5/2003 | Charras et al. | 297/378.12 |
| 2003/0090138 | A1 | * | 5/2003 | Rabbach et al. | 297/378.12 |

FOREIGN PATENT DOCUMENTS

DE   28 29 701 A1   1/1980

* cited by examiner

Primary Examiner—Peter M. Cuomo
Assistant Examiner—Rodney B. White
(74) Attorney, Agent, or Firm—Akerman Senterfitt

(57) ABSTRACT

A joint fitting for a vehicle seat with a forward tiltable seat back. The joint fitting has a first fitting part, a second fitting part and a pivot joint pivotally joining these two fitting parts. A locking cam is hinged to the first fitting part and is pivotal about a cam axle, the locking cam has a first end region located in proximity to the cam axle and a second end region. A locking bight is configured on the second fitting part and is provided with a first locking side and with a facing second locking side, the distance between these locking sides matching the distance between the two end regions. An actuation device acts on the locking cam at a distance from the cam axle so that the locking cam may be moved from a locking position into a release position. In the locking position, the first end region of the locking cam abuts on the first locking side and the second end region of the locking cam abuts on the second locking side.

13 Claims, 5 Drawing Sheets

JOINT FITTING FOR A VEHICLE SEAT WITH A FORWARD TILTABLE SEAT BACK

Figure 1:
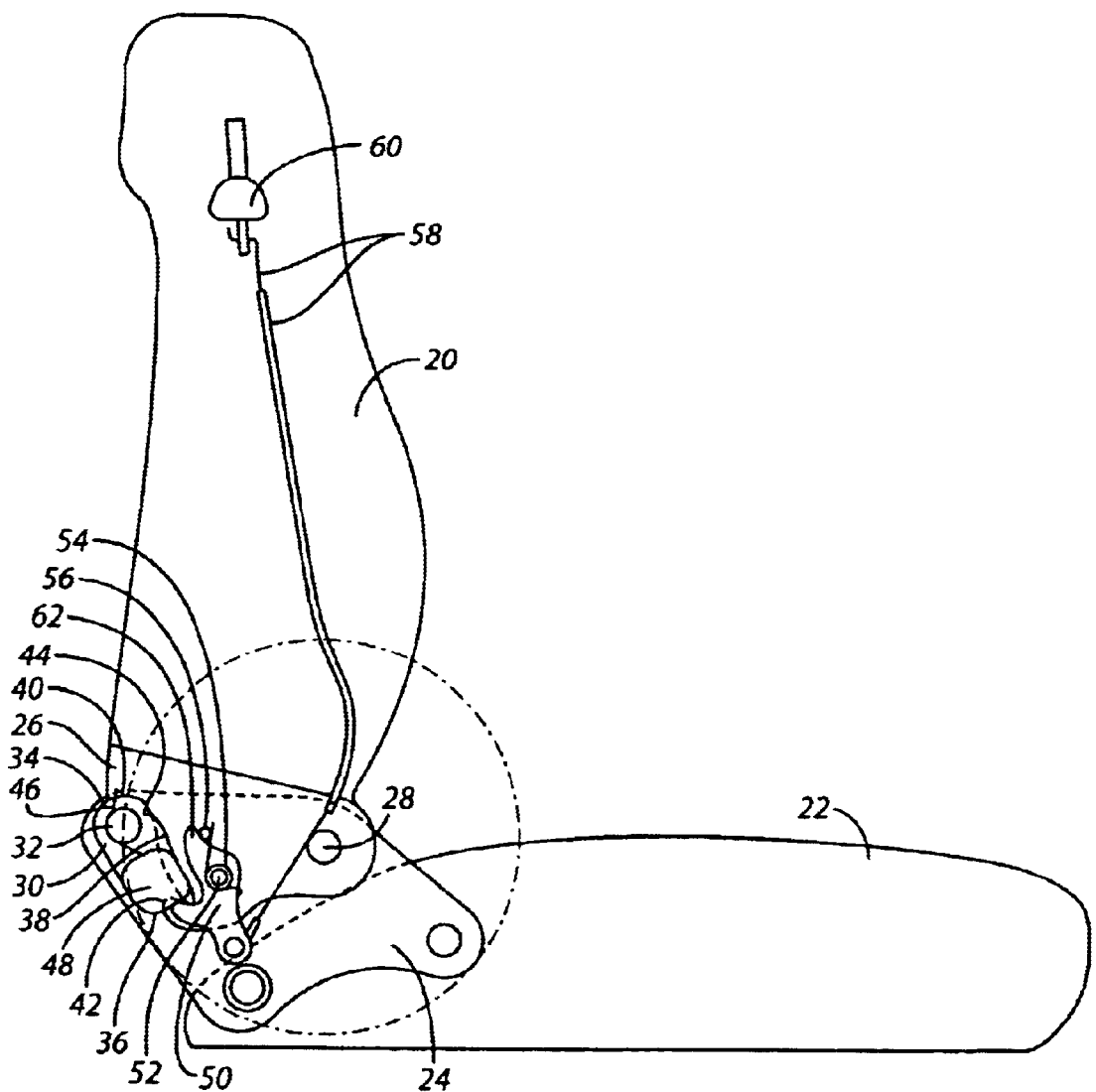
Figure 1A:
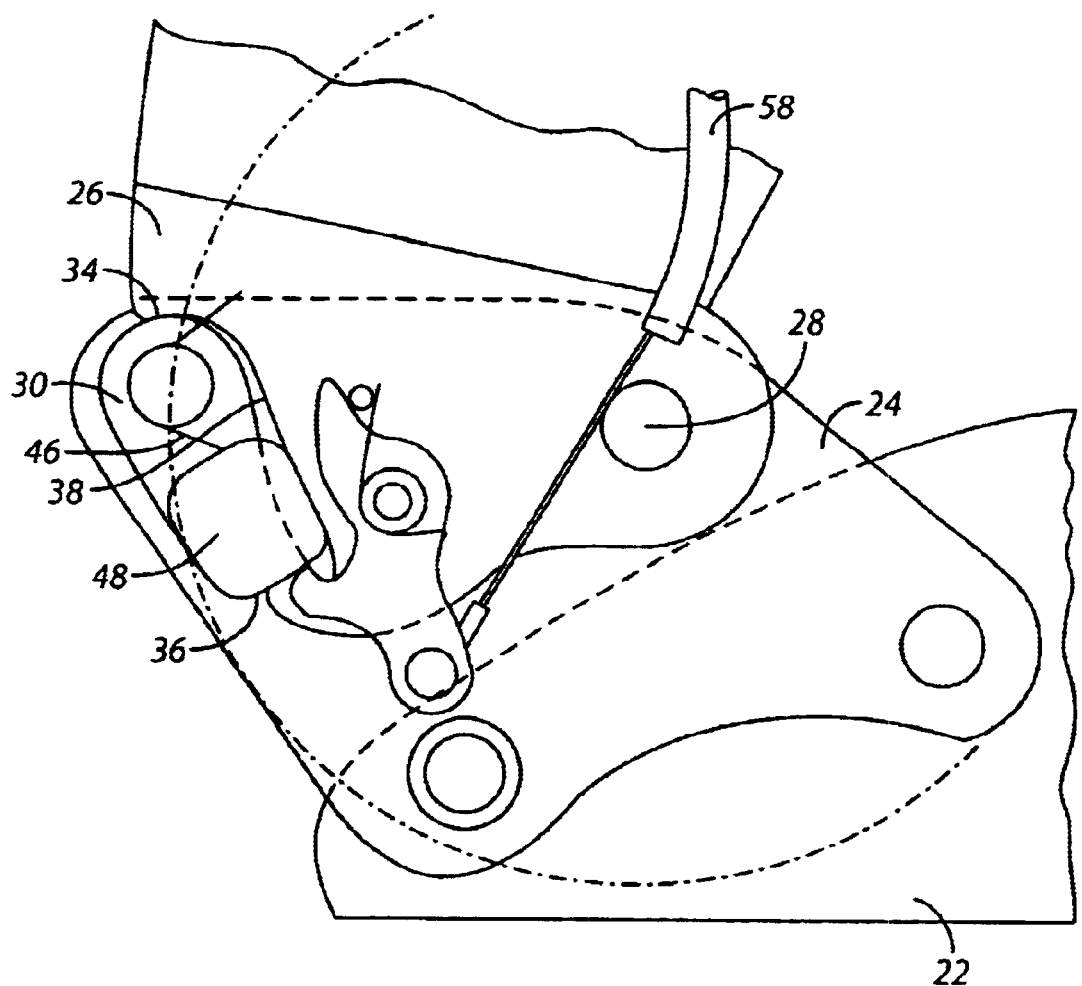

The invention relates to a joint fitting intended for use in a vehicle seat with a forward tiltable seat back which is provided with a first fitting part, a second fitting part and a pivot joint by way of which said two fitting parts are pivotally joined together.

In automotive vehicles with only two side doors in particular, the front seats usually have a forward tiltable seat back in order to facilitate access to the rear seats. Prior art joint fittings of the type mentioned herein above are described in DE 28 29 701 A, U.S. Pat. Nos. 4,269,446, 6,030,042 for example and have a hook hinged to the one fitting part, with said hook cooperating with a bolt provided at the other joint portion. After the hook is detached from the bolt, the fitting parts may be pivoted relative to each other about the hinge axle. As a result thereof, the seat back may be tipped forward. On tilting it back again, the movement is limited by a mechanical stop located between the first and the second joint fitting. Once this stop is reached, the corresponding angular position is secured between the two fitting parts by hooking said hook up onto the bolt.

Additionally, this type of vehicle seats also has a fitting that permits to adjust the inclination of the seat back relative to the seat carrier. The adjustment of this fitting requires quite a lot of time, though. The joint fitting of the type mentioned herein above permits to achieve a quick adjustment by a greater angle, e.g., 90°.

The previously known joint fitting is clearance-free because the hook contacts the bolt alongside a hook surface which, as the hook is increasingly pivoted about the bolt, increasingly pulls the bolt toward the pivot axis of the hook.

Normally, the hook is in its locking position. The hook is allocated an elastic means that biases said hook in the locking position. There is provided a traction means that acts on the hook and allows the hook to pivot out of its locking position against the action of the elastic means. The traction means ends in a handle which usually is located in the upper region of the seat back, on the side thereof. By actuating the handle, the hook is pivotally released for a quick adjustment of the seat back.

Said previously known joint fitting has proved its worth. In the known embodiments of the joint fitting, the paths on which the support is carried out are quite long. Accordingly, the lever arms are relatively large.

This is where the invention comes to bear. It is an object of the invention to indicate another construction of a joint fitting, in which the paths for support are short in the locked condition, which is of a compact design and in which the pivot bearing of the part responsible for the locking needs not be used to assist in providing compensation for play.

The solution to this object is embodied by a joint fitting intended to be used in a vehicle seat with forward tiltable seat back which is provided with a first fitting part, a second fitting part and a pivot joint by way of which these two fitting parts are pivotally joined together, said joint fitting being further provided with:
- a locking cam pivotally hinged to the first fitting part about a cam axle and having a first end region located in proximity to the cam axle and a second end region located opposite to the first end region,
- a locking bight configured on the second fitting part and provided with a first locking side and with a second locking side facing the first locking side, the distance between said locking sides matching the distance between the two end regions, and
- an actuation device acting on the locking cam at a distance from the cam axle for moving the locking cam from a locking position in which the joint fitting is blocked into a release position, wherein in the locking position the first end region of the locking cam buts on the first locking side and the second end region of the locking cam abuts on the first locking side and the second end region of the locking cam abuts on the second locking side and a circle having the pivot joint for center and passing through the cam axle intersects the first locking side, the second locking side being inside said circle.

In this joint fitting, the locking cam forms the stop needed to limit the return movement when the forward tipped seat back is reclined backward. Accordingly, a separate stop as it is provided with the prior art joint fitting is not necessary.

On the other side, in the locking position, the locking cam positions itself with its two end regions lying between the two locking sides of the locking bight. The locking cam, whose function is similar to that of the hook in the joint fitting of the art, not only provides fixation in one pivotal direction, but in the two possible pivotal directions of the seat back. As a result thereof, the pivot axis, i.e., the cam axle, is virtually not loaded, no clamping forces being at any rate introduced into the other fitting part via the cam axle, as this is the case with the prior art fitting. The first locking side may be located in immediate proximity to the cam axle so that the bearing of the locking cam may be simple. The clamping forces are generated by the end regions of the locking cam directly contacting the associated locking sides. In this locking position, the cam axle is no longer needed. It is needed to transmit the force and to move the locking cam into the release position and from there back into the locking position, but not for the locking process itself.

A clearance-free joint fitting is achievable by simple means. As compared to the prior art joint fitting, less parts are needed. Locking is performed with greater accuracy. As a result thereof, the transmission of the joint position of the joint fitting of one seat side to the joint fitting of the other seat side is facilitated and more accurate.

In a prior art joint fitting, the hook is the pivotal locking means. In the locking condition, the hinge axle of said locking means is pulled toward the locking region. With the joint fitting in accordance with the invention, the process is exactly reversed. In the locking condition, the free end of the locking cam pushes the pivot joint away. Since however, a support in the form of the end region located there, i.e., of the first end region, and of the first locking side is located in immediate proximity to the pivot joint, what determines the locking position is not the hinge axle but the fit of the locking cam and of the locking bight.

A circle having the pivot joint for center and passing through the cam axle also intersects the first locking side but remains outside of the second locking side. As a result thereof, the locking cam remains outside of the circular movement described by the second locking side and, more generally, by the locking bight when the seat back is tipped forward. On tilting it back, the first end region abuts on the first locking side, thus forming the described stop for the return movement.

Like in prior art, an actuation device is provided. But now, said actuation device acts onto the locking cam. Normally, the locking cam is in the locking position. By actuating the actuation device, it is pivoted from the locking position into the release position. As a result thereof, it is possible to quickly tilt the seat back forward.

In a preferred development, a torsion bar is arranged on the locking cam, said torsion bar elastically biasing said locking cam in one direction of rotation, which is opposed to the direction of rotation on tilting the seat back forward. As a result thereof, said torsion spring always loads the locking cam relative to the first fitting portion in the locking position and maintains it.

In a preferred development, on tilting the forward tipped seat back backward, the first contact occurs between the first locking region and the first locking side in one point of the first end region which is positioned in such a way relative to the cam axle that a pivoting moment is applied. Accordingly, the first contact causes the second end region to be moved toward the second locking side.

In a further improvement, it is suggested that the first locking side is oriented on a portion of a straight line that passes through the hinge axle. This permits to achieve precise abutment when the seat back is tilted back.

In an advantageous development, the actuation device has a control part which is hinged to the second fitting part. There is provided a traction means which is more specifically configured as a Bowden cable and allows the control part to pivot from its position of rest into a release position. The control part has a release arm that pushes the control cam from the locking position into the release position as the traction means is actuated. The locking cam is actuated in this manner. Although it is possible, in principle, to actuate the locking cam directly, the actuation via the control part has the advantage that the traction means can act on a part that moves together with the same fitting part as the handle of the traction means. Accordingly, it is not necessary to arrange the traction means in such a manner that no pull is exerted onto the traction means when the seat back is pivoted.

In another development, the control part has a retaining lug which engages behind a blocking side of the locking cam in the position of rest of the control part. In this way, the locking cam is mechanically blocked. It cannot be pushed out of the locking position, not even by acceleration forces acting onto the locking cam.

Further advantages and characteristics of the invention will become apparent in the other claims and in the following description of an exemplary embodiment that is not limiting the scope of the invention and will be explained in more detail herein after with reference to the drawing.

Figure 2:
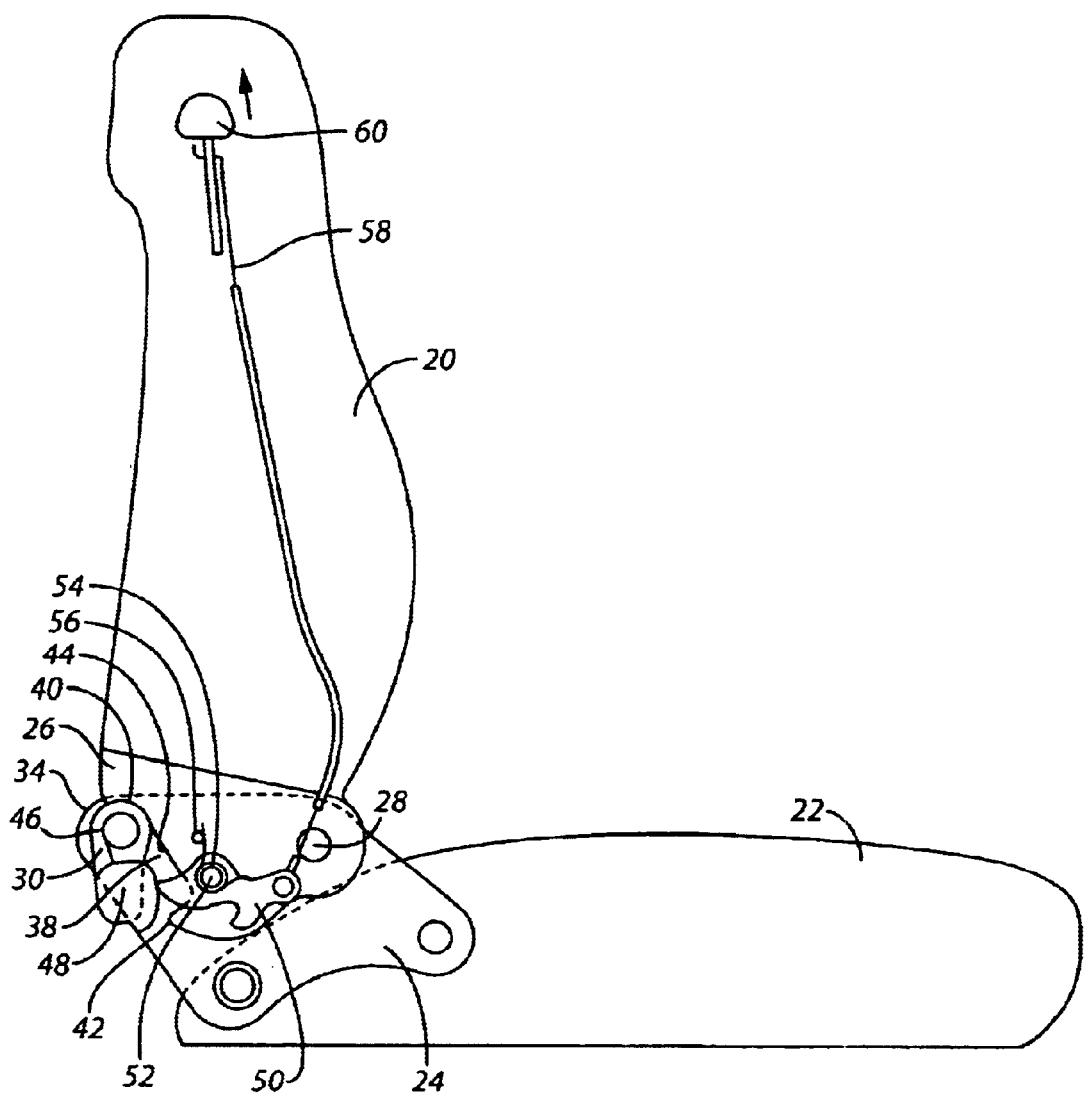
Figure 3:
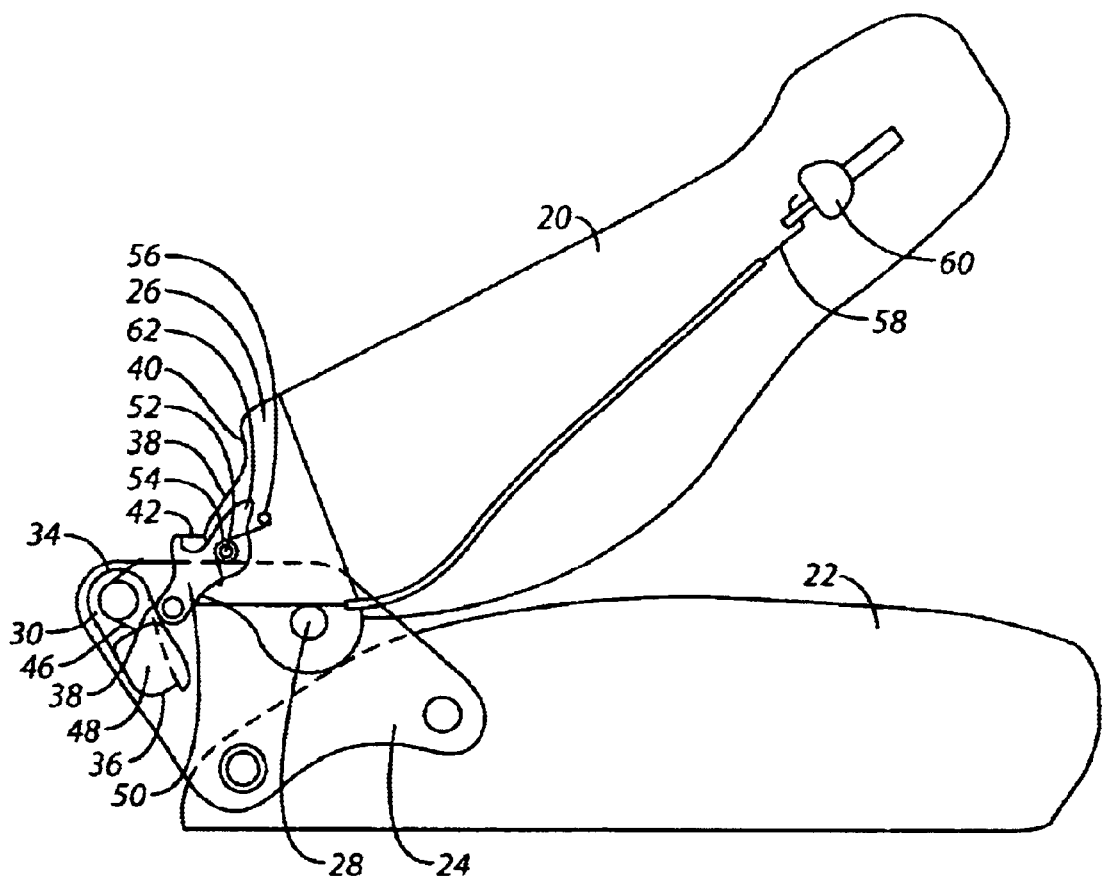
Figure 3A:
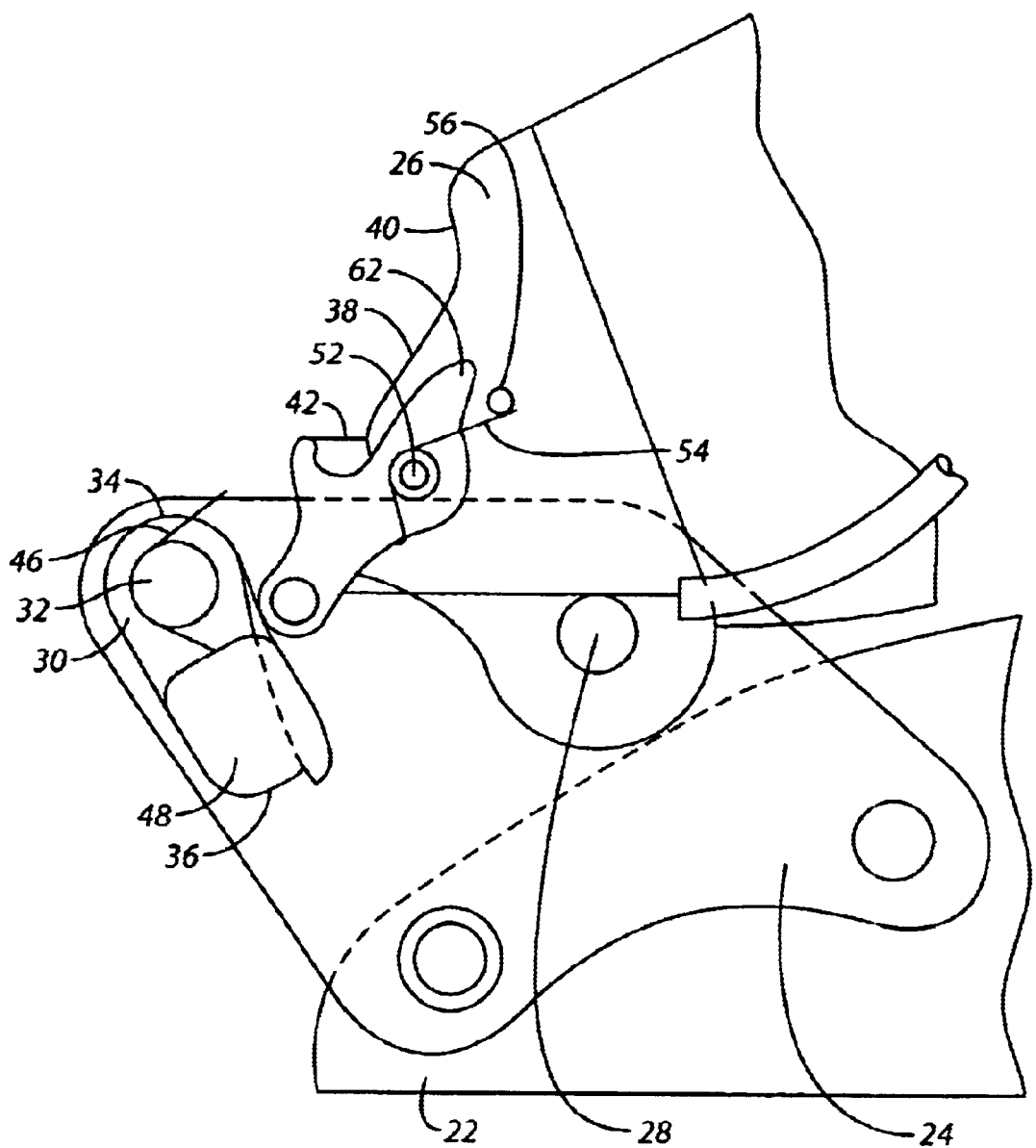

FIG. 1 is a side view of the most important parts of a vehicle seat with a forward tiltable seat back, the seat back being locked in its normal position, FIG. 2 is a view like FIG. 1, but here, the joint fitting between seat back and one seat carrier is unlocked and FIG. 3 is a view like FIG. 2, but here, the seat back is tipped forward.

The Figs. show a vehicle seat fitted with a forward tiltable seat back 20. It also has a seat carrier 22. Said seat carrier is shown in a schematic view, it is connected to an underbody of a vehicle (not shown) by way of a well known underframe (not shown).

Seat back 20 and seat carrier 22 are connected together by way of a joint fitting. Said joint fitting has a first fitting part 24, which is substantially configured as a plate and is connected to the seat carrier 22 by two fastening points, and a second fitting part 26, which pertains to the seat back and is connected to a carrier (not shown) of the seat back. These two fitting parts 24, 26 are joined together by means of a pivot joint in such a manner that they are pivotal about a hinge axle 28.

On the first fitting part 24, a locking cam 30 is pivotally hinged about a cam axle 32. It has a first end region 34, which is located in immediate proximity to the cam axle 32 and also a second end region 36 located opposite the first end region 34.

On the second fitting part 26, a locking bight 38 is configured in proximity to the locking cam 30. Said locking bight substantially consists of a first locking side 40, of a second, opposite locking side 42 and of a base 44 that joins these locking sides 40, 42. The locking bight 38 has a shape which substantially matches the shape of the locking cam 30 and is capable of receiving it, as can be seen in FIG. 1. For this purpose, the distance between the locking areas 40, 42 is made to match the distance of the two end regions 34, 36.

The shape of the second end region 36 and that of the second locking side 42 are matched in such a manner that increasing contact occurs between the second end region 36 and the second locking side 42 as the locking cam 30 increasingly pivots about its cam axle 32 into the locking position. These two boundary lines, i.e., second end region 36 and second locking side 42, are oriented in such a manner that they are positioned at an angle below self-hindrance, i.e., at an angle of typically 7, 10 or 14°, depending on the material used. This oblique orientation permits to compensate manufacturing and mounting inaccuracies.

The contact between the second end region 36 and the second locking side 42 generates a reaction force in the region of the first end region 34. Said first end region is pressed against the first locking side 40 associated thereto. As shown in FIG. 1, the locking cam 30 is thus supported between the two locking sides 40, 42 when it is in the locking position.

The locking cam 30 is elastically biased in the locking position shown by a torsion spring 46. It is also form-fittingly retained in the locking position, this will be discussed herein after.

A kinematic inversion may be obtained when the locking cam 30 is hinged to the second fitting part 26, the locking bight 38 being then located on the first fitting part 24.

In the embodiment shown and seen in the direction of a front edge of the seat, locking cam 30 and locking bight 38 are located behind the hinge axle 28, and are also on approximately the same height as said axle. The arrangement locking cam 30 and locking bight 38 may also be disposed in another angular position relative to the hinge axle 28 as the one shown.

The second fitting part 26 is also shaped like a plate. The locking cam 30 is preferably made of a sheet iron that has the same thickness as the second fitting part 26. With regard to the first fitting part 24, second fitting part 28 and locking cam 30 are located on the same side as the first fitting part 24. On the main face of the locking cam, which is turned away from the first fitting part 24, a plate-shaped safety piece is fastened. In the direction in which the locking cam 30 pivots into the locking position shown in FIG. 1, it is still located before the corresponding rim of the locking cam 30, thus straddling the locking cam 30. In the locking position shown, a portion of the second fitting part 26, which is arranged in the immediate neighborhood of the looking cam 30, is located between the safety piece 48 and a corresponding portion of the first fitting part 24. In case the locking cam is heavily loaded, in case of an accident for example, the free end of the locking cam is prevented from moving out of the plane of the drawing and the locking engagement from getting lost as a result thereof.

The safety piece 48 additionally forms a blocking side 50 that projects from the free end of the locking cam 30; said blocking side will be discussed herein after.

In immediate proximity to the locking cam 30, there is a control part 50 of an actuation device. It is arranged on another fitting part than the locking cam 30, i.e., on the second fitting part. It is arranged on the second fitting part 26 in such a manner that it is pivotal about a control part axle 52. A pivot spring elastically biases it in such a manner that it is pressed against a stop 56.

The control part 50 is substantially three-armed. The three arms together form a "T". A first arm, pointing downward, is connected to a traction means which is here configured as a Bowden cable 58. It ends in the upper region of the seat back 20, on the side, in a handle 60 that is configured as a rocker or as a pivot lever for example. It is devised in such a manner that traction may be exerted onto the core of the Bowden cable. Under the action of the pivot spring, the handle 60 normally is in a position of rest.

A release arm 62 is located opposite the arm described, it has a rounded contact face, which, in FIG. 1, is spaced from the safety piece 48 of the locking cam 30. This safety piece 48 is located in the same plane as the control part 50, that is, still above the second fitting part 26. When pull is exerted on the Bowden cable 58, the release arm 62 approaches the safety piece 48 against the action of the pivot spring 54. If pull is continued, the locking cam 30 is pivoted clockwise outward about its cam axle 32, as shown in FIG. 2. The seat back 20 may now b tipped forward about the hinge axle 28 into the position shown in FIG. 3. During this tilting movement, control part 50 and locking cam 30 remain in contact so that the locking cam 30 is not free to pivot counter-clockwise under the action of its torsion spring 46.

A third arm of the control part 50 is substantially shaped like a hook and engages, in the locking position shown in FIG. 1, behind the stop 56. As a result thereof, it is made certain that the locking position is achieved in a mechanical and form-fitting manner.

The handle 60 on the seat back only needs to be actuated until, starting from the condition according to FIG. 1, it reaches the condition according to FIG. 2 and until the seat back 20 has been pivoted forward by a certain angle, without however having already reached the position shown in FIG. 3. A short tip forward suffices to prevent the locking cam 30 from falling back on its own account into the locking bight 38 when the handle 60 is no longer held.

If, however, a user lets go the handle 60 in the condition according to FIG. 2, the locking cam 30 enters into its locking bight 38.

If, starting from the tilted condition shown in FIG. 3, the seat back is tilted back counter-clockwise, the locking cam 30 glides alongside the control part 50 and in parts also alongside the free small face of the second fitting part 26 until the first end region 34 abuts on the first locking side 40. Return movement is limited as a result thereof. The cam axle 32 is spaced from the hinge axle 28 by the same distance as approximately the center of the first locking side. The second locking side 42, by contrast, is spaced from the hinge axle 28 by a much smaller distance, the same applying to the base and, on the other side of the second locking side 42, for the adjoining regions of the second fitting part 26. As a result thereof, the locking cam 30 does not prevent the seat back 20 from being tilted.

As soon as the first end region 34 abuts on the first locking side 40 as the seat back 20 executes the return movement described, the locking cam 30 is allowed to pivot further into the locking bight 38. Contact is established between second end region 36 and second locking side 32. On account of the geometry described, any clearance between the locking sides 40, 42 and the respective ones of the end regions 34, 36 is eliminated when the pivotal movement is continued. As a result thereof, a clearance-free stop is achieved in the locking position of the seat back 20.

What is claimed is:

1. A joint fitting for a vehicle seat said vehicle seat having a forward tiltable seat back, the joint fitting being provided with a first fitting part, a second fitting part and a pivot joint having a hinge axle, said pivot joint pivotally joining the first fitting part and the second fitting part, the joint fitting further comprising:
    a locking cam pivotally hinged to the first fitting part about a cam axle and having a first end region located in proximity to the cam axle and a second end region located opposite to the first end region;
    a locking bight configured on the second fitting part and provided with a first locking side and with a second locking side facing the first locking side, the distance between the locking sides matching the distance between the two end regions; and
    an actuation device acting on the locking cam at a distance from the cam axle for moving the locking cam from a locking position in which the joint fitting is blocked into a release position,
    wherein, in the locking position, the first end region of the locking cam abuts on the first locking side, and the second end region of the locking cam abuts on the second locking side, and
    wherein a circle defined with the pivot joint at its center and passing through the cam axle intersects the first locking side, the second locking side being inside the circle.

2. The joint fitting according to claim 1, wherein a torsion spring is provided and is arranged between the locking cam and the first joint part, the torsion spring biasing the locking cam relative to the first fitting part in a direction of rotation counter to the direction of rotation when the seat back is being tipped forward.

3. The joint fitting according to claim 1, wherein the first locking side is oriented along a straight line passing through the cam axle.

4. The joint fitting according to claim 1, wherein the actuation device is provided with a control part which is hinged to the second fitting part, is connected to a traction means and has a release arm which presses the locking cam from the locking position into a release position when the traction means is actuated.

5. The joint fitting according to claim 4, wherein a pivot spring is allocated to the control part, the pivot spring elastically biasing the control part in a position in which the control part is located outside of the locking bight.

6. The joint fitting according to claim 4, wherein the traction means is a Bowden cable.

7. The joint fitting according to claim 4, wherein the control part is further provided with a retaining lug that engages, in a position of rest of the control part, behind a blocking face of the locking cam.

8. The joint fitting according to claim 7, wherein the locking cam is located between a safety piece and the first fitting part when the locking cam is in the locking position.

9. The joint fitting according to claim 1, wherein the locking cam is provided with at least one safety piece that is located beside the second fitting part when the locking cam is in the locking position.

10. The joint fitting according to claim 1, wherein the first fitting part is connected to a seat carrier and wherein the second is connected with a carrier of the seat back.

11. The joint fitting according to claim 1, wherein the vehicle seat has two s at sides and wherein one joint fitting is provided on each seat side, the two joint fittings being motion-linked together by a driver unit.

12. The joint fitting according to claim 1, wherein an arc of a circle having the hinge axle for center and passing through the cam axle intersects the first locking side and passes outside of the second locking side.

13. The joint fitting according to claim 1, wherein the first locking side is oriented along a straight line passing through the hinge axle.

* * * * *